US006862112B2

(12) United States Patent
Cooper (10) Patent No.: US 6,862,112 B2
(45) Date of Patent: Mar. 1, 2005

(54) SYSTEM AND METHOD FOR COLOR DITHER MATRIX CREATION USING HUMAN-VISION-SYSTEM GRAY MATRIX WITH MULTI-CELL REPLACEMENT

(75) Inventor: Ted J. Cooper, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 865 days.

(21) Appl. No.: 09/816,585

(22) Filed: Mar. 23, 2001

(65) Prior Publication Data

US 2002/0159095 A1 Oct. 31, 2002

Related U.S. Application Data (60) Provisional application No. 60/231,364, filed on Sep. 8, 2000, provisional application No. 60/231,031, filed on Sep. 8, 2000, and provisional application No. 60/231,432, filed on Sep. 8, 2000.

(51) Int. Cl.[7] ............................................. G06K 15/00
(52) U.S. Cl. ....................... 358/1.9; 358/3.13; 358/3.19
(58) Field of Search ............................... 358/1.9, 3.14, 358/3.16, 2.1, 3.13, 535, 3.19, 3.09; 382/260

(56) References Cited

U.S. PATENT DOCUMENTS

| | | | |
|---|---|---|---|
| 5,111,310 A | 5/1992 | Parker et al. ............... 358/3.19 |
| 5,323,247 A | 6/1994 | Parker et al. ............... 358/3.08 |
| 5,341,228 A | 8/1994 | Parker et al. ............... 358/534 |
| 5,477,305 A | 12/1995 | Parker et al. ............... 358/3.19 |
| 5,543,941 A | 8/1996 | Parker et al. ............... 358/534 |
| 5,708,518 A | 1/1998 | Parker et al. ............... 358/534 |
| 5,726,772 A | 3/1998 | Parker et al. ............... 358/3.19 |

FOREIGN PATENT DOCUMENTS

| | | | | |
|---|---|---|---|---|
| JP | 03-089777 | * | 4/1991 | ............ H04N/1/40 |
| JP | 03236090 | * | 10/1991 | ............ G09G/5/00 |
| JP | 10136207 A | * | 5/1999 | .......... H04N/1/405 |

* cited by examiner

*Primary Examiner*—Jerome Grant, II
(74) *Attorney, Agent, or Firm*—Blakely, Sokoloff, Taylor & Zafman LLP (57) ABSTRACT

A system and method for gray-scale or color printing is disclosed. One embodiment of the present invention transposes multiple pairs of pixels at the same time. During this process a record of the values of the cost function is kept. After a good statistical sample of multiple pairs of pixel replacements has occurred, the top five combinations are then selected for further refinement. During this next round of calculations the multiple of pairs of pixels transposed is reduced by a factor of two. In another embodiment of the present invention, the selection of the groups of pixels to transpose is controlled. During the initial iteration stages, a minimal radial offset of separation is imposed upon the pixel selection. Typically this minimum radial offset starts at one quarter of the array height. This selection process ensures that transpositions have the largest mixture around the array.

30 Claims, 11 Drawing Sheets

SYSTEM AND METHOD FOR COLOR DITHER MATRIX CREATION USING HUMAN-VISION-SYSTEM GRAY MATRIX WITH MULTI-CELL REPLACEMENT

CROSS-REFERENCE TO RELATED APPLICATIONS

This application claims the benefit of the filing date of U.S. provisional patent application, entitled "Color Dither Matrix Creation Using HVS Gray Matrix with Inversion Technology", Ser. No. 60/231,364, filed Sep. 8, 2000, claims the benefit of the filing date of U.S. provisional patent application, entitled "Color Dither Matrix Creation Using HVS Gray Matrix with Cluster Radii", Ser. No. 60/231,031, filed Sep. 8, 2000, and further claims the benefit of the filing date of U.S. provisional patent application, entitled "Color Dither Matrix Creation Using HVS Gray Matrix with Multi-Cell Replacement", Ser. No. 60/231,432, filed Sep. 8, 2000.

BACKGROUND OF THE INVENTION

1. Field of the Invention

The present invention relates to the field of halftone image production. In particular, the present invention relates to an apparatus and a method for creating a dither matrix in a less compute-intensive manner.

2. Description of Related Art

Figure 1:
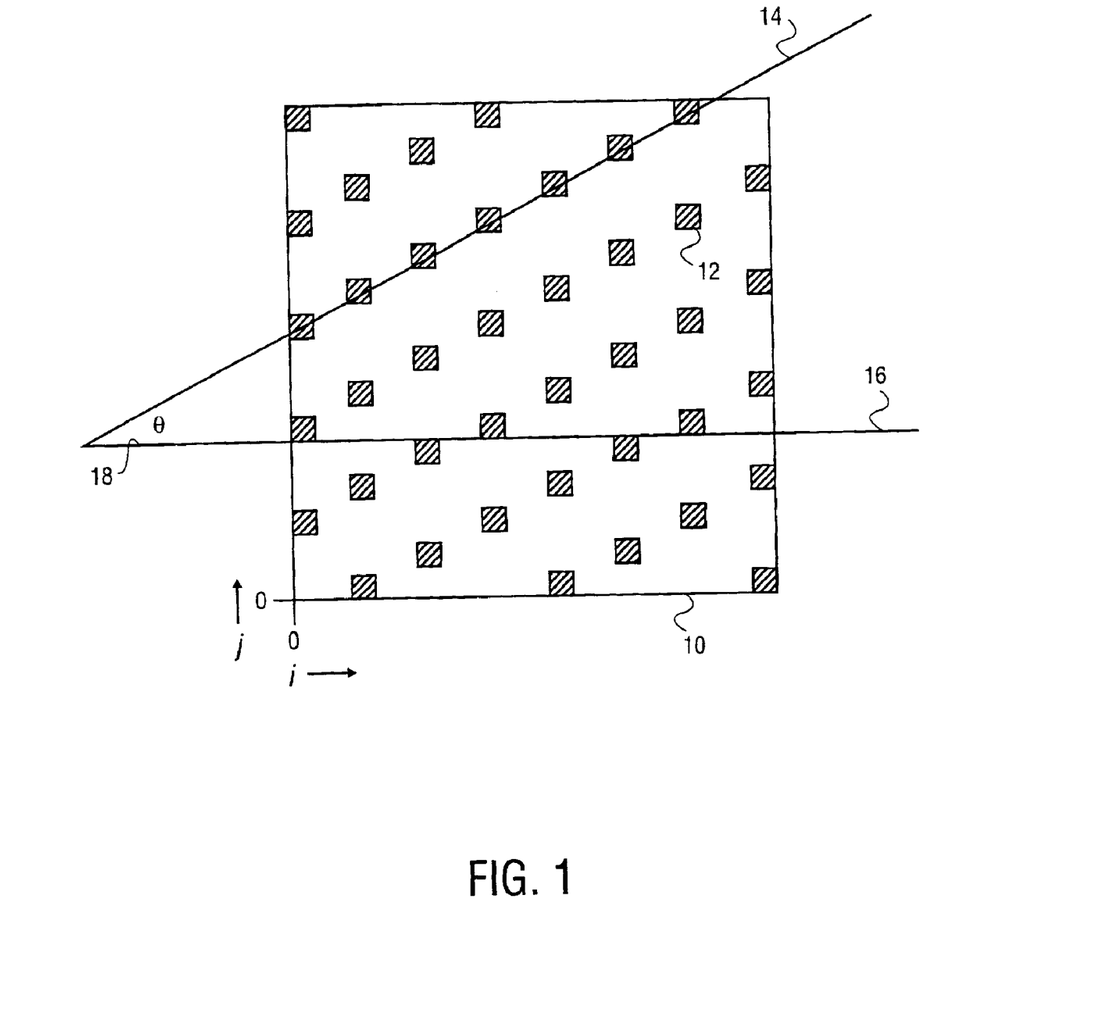
FIG. 1 is a diagram of a portion of a prior art fixed-grid halftone screen.

The use of halftone patterns is required whenever printing graphics with traditional inks upon paper. Halftone techniques arose because the continuously varying gradations of gray scale and colors cannot be directly printed by offset, dot-matrix, ink-jet, and other printer technologies that utilize the deposition of constant-shaded dots of black or colored ink. A common early halftone technique utilized a uniform screen, as shown in FIG. 1. A uniform screen segment 10 includes many cells, of which cell 12 is exemplary. Changing the density of gray scale using the uniform screen 10 may be performed by enlarging or shrinking the size of the ink dot corresponding to each cell. A light gray may be shown by making the ink dots relatively small in size. Conversely, a darker gray may be shown by making the ink dots relatively larger. The ink dot placed at a cell may be of any shape, with the square dots shown in FIG. 1 merely serving as examples.

The uniform screen 10 may be extended to cover an entire image. This is a simple process of uniformly extending the existing screen pattern, and requires no more than simple geometric calculations. However, the exemplary uniform screen 10 of FIG. 1 has certain visual drawbacks. The human visual system (HVS) is very sensitive at recognizing unintentional patterns, called artifacts, caused by the use of a halftone pattern. The HVS is most sensitive to slowly-varying in space ("low frequency") artifacts and much less sensitive to rapidly-varying in space ("high frequency") artifacts. The literature on the subject often characterizes the HVS as possessing a "low-pass filter". Additionally, the HVS is much more sensitive to patterns falling on a horizontal or vertical line. In the FIG. 1 example, the cells line up along line 14. Line 14 forms an angle of θ degrees from a horizontal line 16. It is well-known in the art that the HVS is least sensitive to artifacts when θ is around ±45 degrees.

Figure 2:
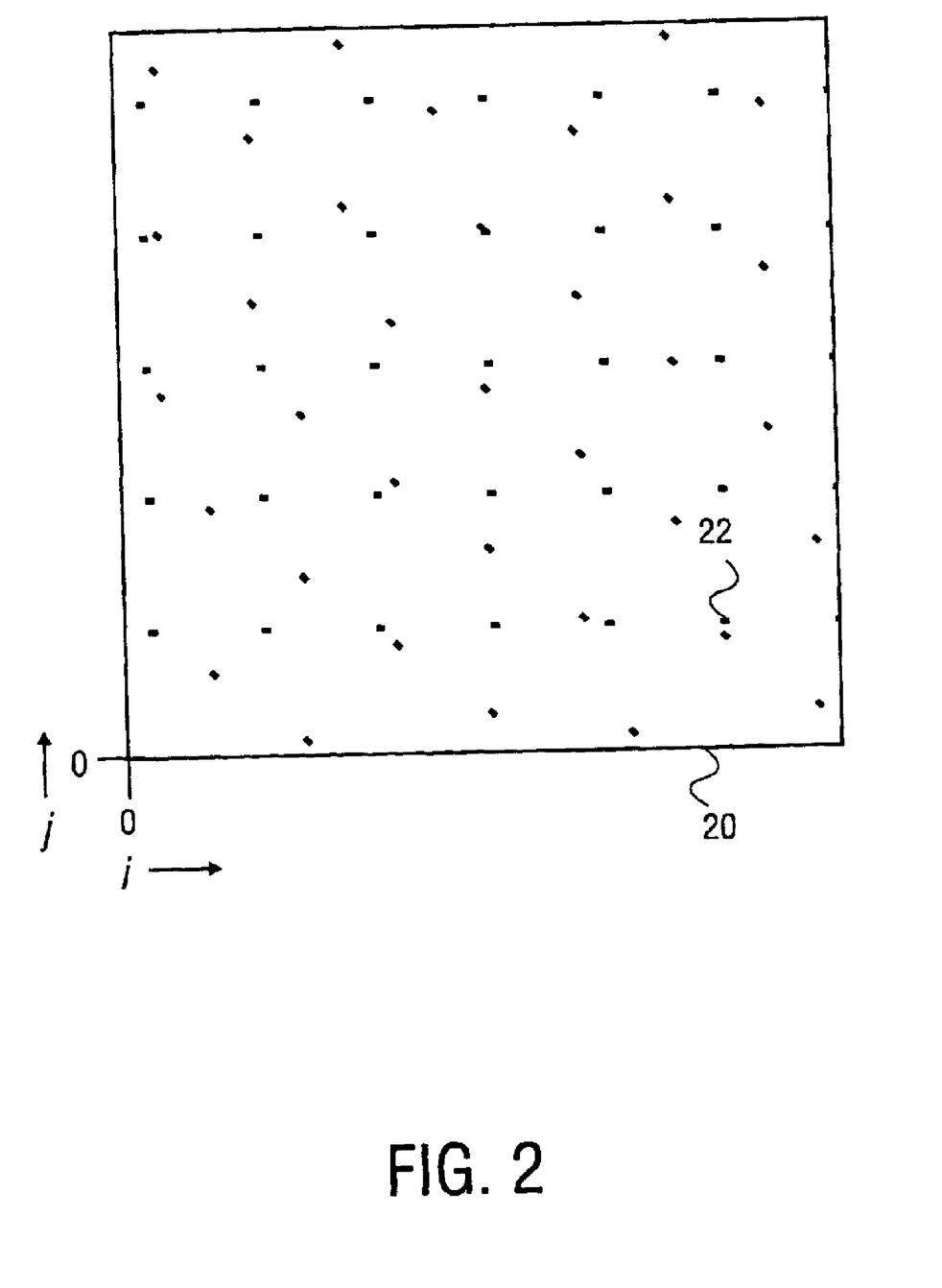
FIG. 2 is a diagram of a dither matrix.

A better approach is illustrated in the dither pattern of FIG. 2. The dither pattern 20 includes a large number of cells, of which a typical one is cell 22. There are more blank spaces between the dots of dither pattern 20 so this would correspond to a light gray. More dots could be added for a darker shade of gray. The cells of dither pattern 20 have been arranged so that repetitive patterns, recognizable by the HVS, are minimized. It would appear on first glance that such a useful dither pattern 20 is "random", but a truly random pattern would include dumps of cells and also empty spaces. Hence the dither pattern 20 would more correctly be described as evenly but not regularly patterned.

Figure 3A:
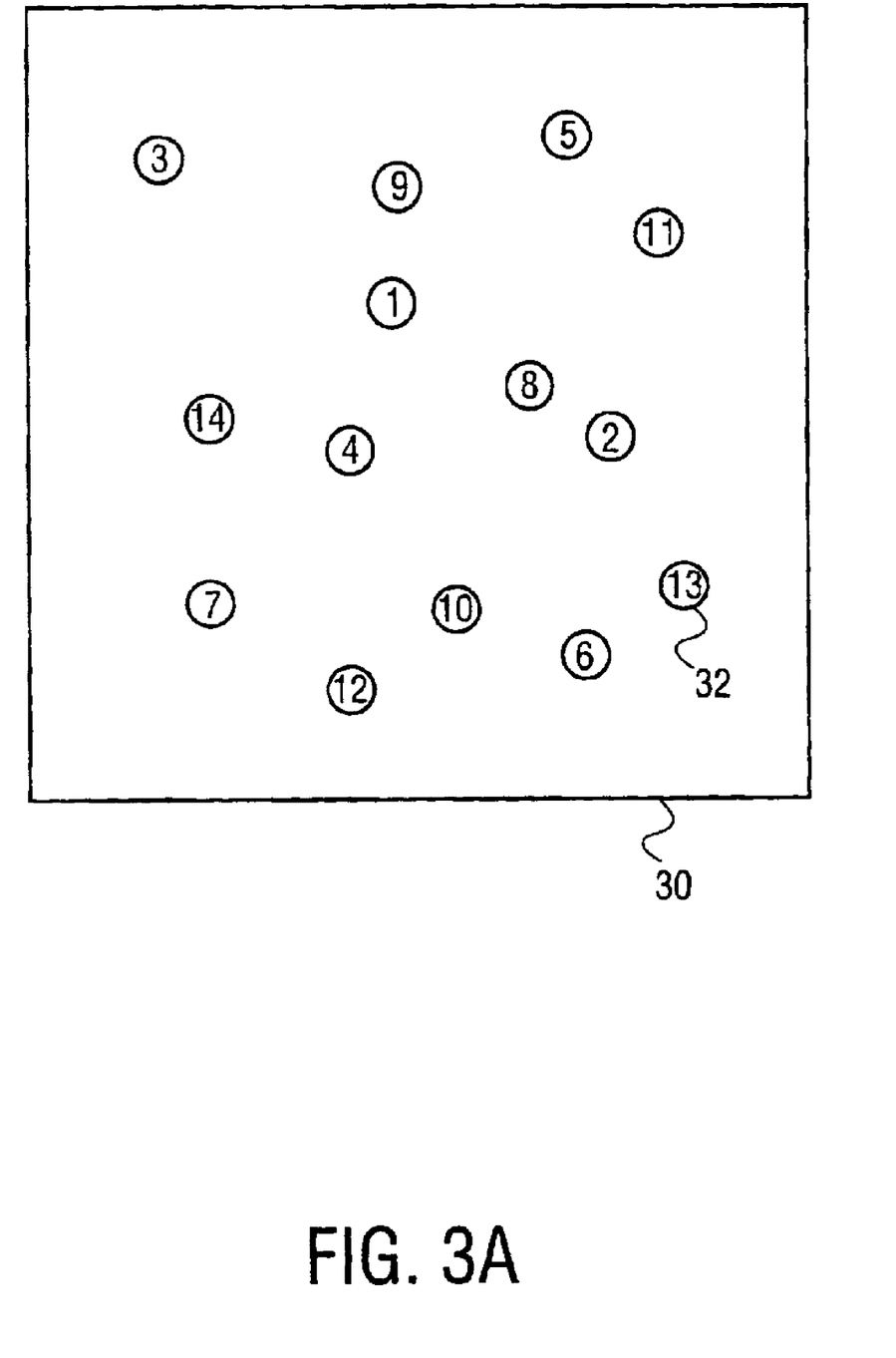
FIG. 3a is a diagram showing some of the elements of a dither matrix.

The dither pattern 20 of FIG. 2 corresponds to a particular percentage of cells being selected for ink-dot placement. In order to allow for differing percentages of cells being selected, a related dither matrix to dither pattern 20 may be created. A dither matrix is a dither pattern with an ordering scheme for including cells depending upon the ratio of ink dots filled cells to total cells required. For clarity, a dither matrix 30 is shown in FIG. 3a with a limited number of cells. In practice, a much larger number of cells would be defined and used in a dither matrix. To create dither matrix 30 from dither pattern 20, each cell such as exemplary cell 22 may have associated with it a threshold value, selected from a sequence from 1 through A, where A is the total number of cells in a dither pattern. For example, the threshold value stored in ordered cell 32 is the number 13. This means that if the ratio of dark cells to total cells is 13/A, then a proper pattern is for the printer to place ink dots at all ordered cells with a threshold value of 13 or less.

Figure 3B:
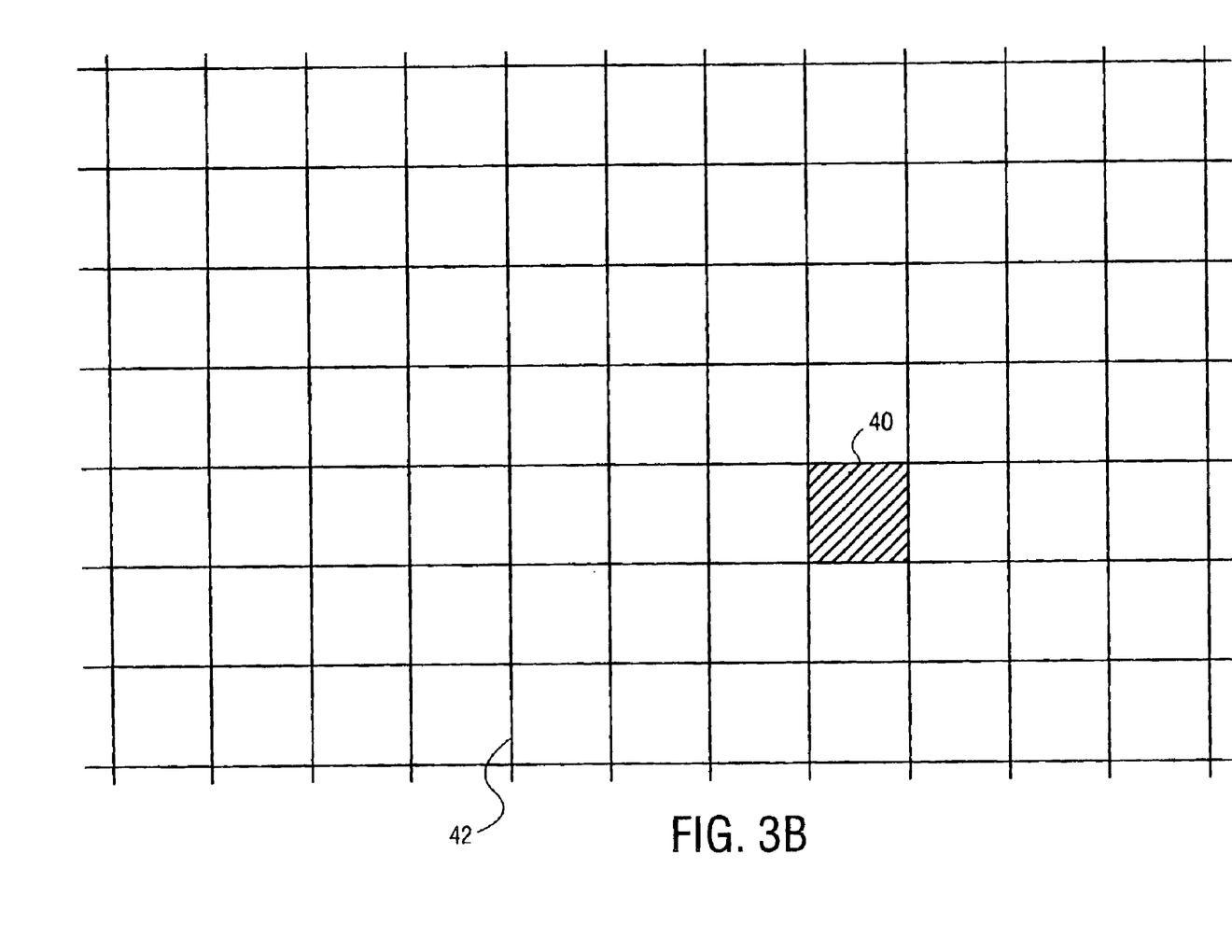
FIG. 3b is a diagram showing the embedding of the dither matrix of FIG. 3A into a larger image environment.

In order to extend the dither matrix 30 to cover an entire image, dither matrix 30 is replicated and applied as tiles. In FIG. 3b a typical tiling scheme is illustrated. A replicated copy matrix 40 of dither matrix 30 is placed at locations in a grid 42 covering the size of the image required.

A useful dither pattern such as dither pattern 20 is not easily created. One method of creating such a useful dither pattern, well-known in the art, is to use the technique known as error diffusion. In this method, first a two dimensional transfer function $V_{ij}$ that models the perceived responsiveness to patterns of the HVS is created. $V_{ij}$ is called a modulation transfer function (MTF). Then, a two-dimensional function $p_{ij}$ that describes the location of all the selected cells in a given dither pattern is defined. Finally, a cost function that approximates the amount of artifacts seen by a human, depending upon $V_{ij}$ and a given $p_{ij}$, is created. In one embodiment, the cost function Cost($p_{ij}$) may be given by Equation 1 below.

$$\text{Cost}(p_{ij}) = \sum_{i=1}^{N} \sum_{j=1}^{N} V^2 ijPijP*ij \quad \text{Equation 1}$$

where Pij is the discrete Fourier transform (DFT) of the given pattern $p_{ij}$. Other cost functions, known in the art, may be used.

One method of selecting the least-objectionable pattern $p_{ij}$ for use in a dither pattern is to evaluate the cost function for all such patterns $p_{ij}$, and then select one of the $p_{ij}$ corresponding to the minimum value of the cost function. This is not practicable. The number of such possible combinations $p_{ij}$ representing M cells selected in a dither pattern of N by N cells is $(N^2!)/M!(N^2-M)!$. This is an enormous number even for smaller dither patterns such as 32 by 32, and the number increases substantially for desired dither patterns of 256 by 256 or even 1024 by 1024 cells. Evaluating Equation 1 for such large numbers of candidate patterns is computationally intensive, and for all but the smallest sizes of dither patterns is impractical with reasonable amounts of computer resources.

SUMMARY

A system and method for printing in gray-scale or color is disclosed. In one embodiment, a method for determining a dither matrix begins by selecting a parent dither pattern. Then the value of the cost function of the parent dither pattern is calculated. A candidate dither pattern is then created by transposing a set of black pixels with a set of white pixels within the parent dither pattern. The value of this candidate dither pattern is calculated and then compared to the value previously calculated to see if the candidate dither pattern has improved performance (lower value of cost function). The number of elements in each set of black and white pixels may be an even number greater than two.

In other embodiments, a dither array may be selected and conjoining to a boundary area, thereby creating an area for a parent dither pattern. Upon calculating a value of the cost function of the parent dither pattern, the process of transposing a set of black pixels and a set of white pixels may again be used to form a candidate dither pattern. The value of the cost function of this new candidate dither pattern may again be calculated and compared to the value previously calculated for the parent dither array.

BRIEF DESCRIPTION OF THE DRAWINGS

The features, aspects, and advantages of the present invention will become more fully apparent from the following detailed description, appended claims, and accompanying drawings in which:

DETAILED DESCRIPTION

In the following description, numerous specific details are set forth to provide a thorough understanding of the present invention. However, one having an ordinary skill in the art will be able to practice the invention without these specific details. In some instances, well-known circuits, structures, and techniques have not been shown in detail to not unnecessarily obscure the present invention.

The present invention includes a method that allows the computation of the cost function to proceed at an accelerated rate than the current processes used to create dither patterns for use in printing. The cost function is reasonably smooth once a good starting "seed point" is established. One embodiment of the present invention makes use of this fact and transposes multiple pairs of pixels at the same time. The number of pairs of pixels transposed may be a multiple of two. During this process a record of the values of the cost function is kept. After a good statistical sample of multiple pairs of pixel replacements has occurred, the top array combinations, for example the top five combinations, (lowest cost function values) are then selected for further refinement.

During this next round of calculations the multiple of pairs of pixels transposed is reduced by a factor of two. For example, if eight pixels (four pairs, including four black and four white) were initially transposed, then, at the next iteration four pixels (two pair, including two black and two white) at a time will be replaced. In one embodiment, the selection from the arrays of which pixel locations having the lowest cost functions to transpose is random, thus this process will quickly search to a general minimum value of the cost function.

Figure 4:
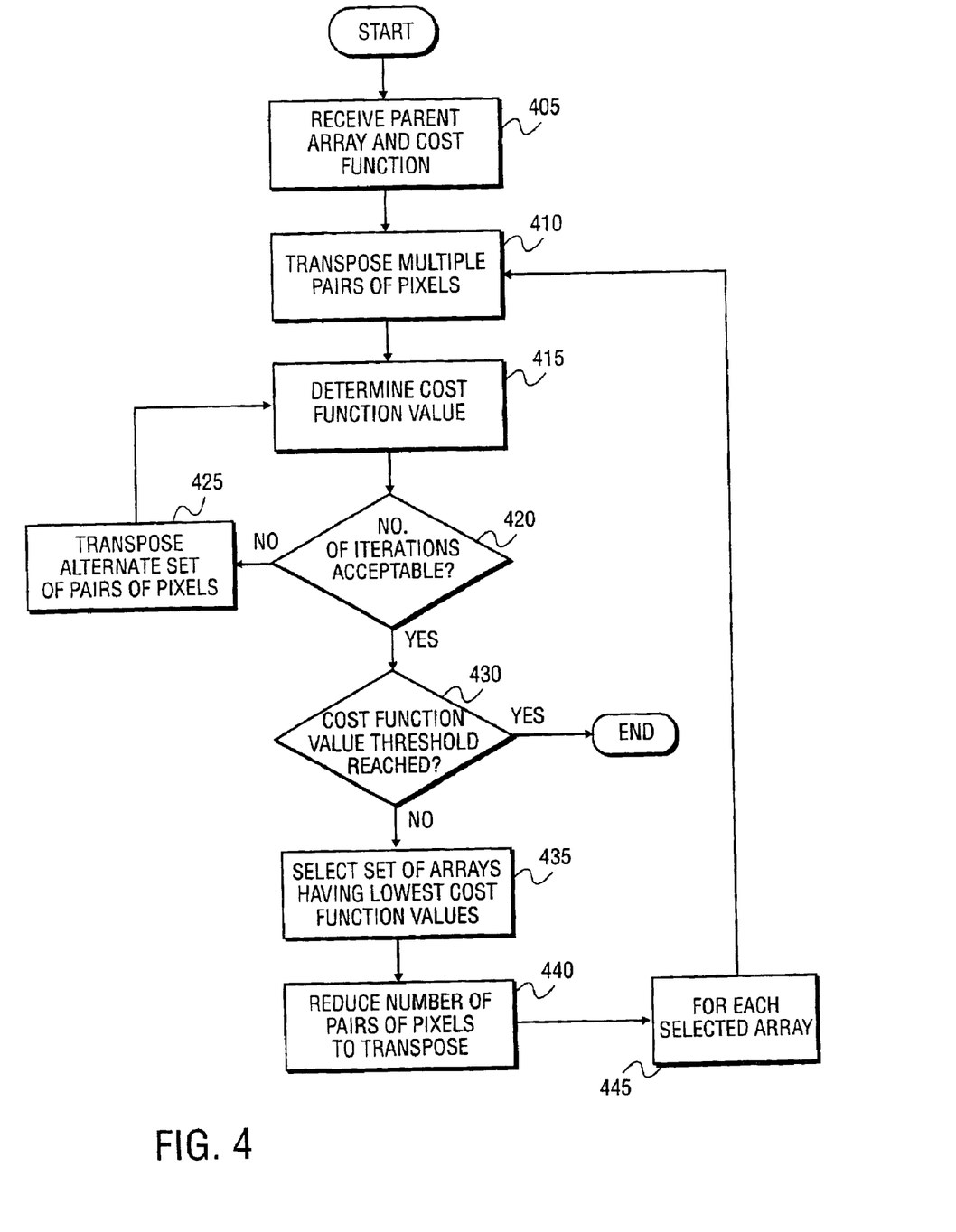
FIG. 4 is a flow diagram illustrating one embodiment of the method of the present invention.

One embodiment is illustrated in FIG. 4. At step 405 a parent array is received. At step 410, multiple pairs of pixels are transposed. As noted above, the number of pairs may be a multiple of two. At step 415 the cost function is computed for the array using the transposed pairs of pixels. At step 420 if the number of iterations, that is, the number of transposed arrays is acceptable, then, at step 430, it is determined whether cost value threshold, such as a minimum of the cost function, has been reached. If it has, the process is complete. If it has not, then the process continues at step 425, which transposes an alternate set of pairs of pixels and determines the cost function. Steps 415, 420, 425 function to generate as many sample arrays of transposed pairs of pixels needed to provide a statistical sample of the multiple pixel pair replacements. At step 435, arrays having the lowest corresponding cost function values are selected, and at step 440, the number of pairs of pixels to be transposed is reduced. For example, in one embodiment, the number of pairs are reduced by a factor of two. Then, at step 445 for each selected array the process proceeds through steps 410, 415, 420, 425, 430, 435, 440 and 445 as needed until a minimum of a cost function is reached.

In another embodiment of the present invention, the selection of the groups of pixels to transpose is controlled. In a purely random selection process, adjacent pixels could be transposed. Only at the very end of the computational process would this be a meaningful replacement, since it has the least effect upon the global dither array. Thus, in one embodiment, during the initial iteration stages, for example, when larger numbers of pixels are being simultaneously transposed, a minimal radial offset of separation may be imposed upon the pixel selection. In one embodiment, this minimum offset starts at one quarter of the array height, but may be a value below one quarter or a value up to the width and height of the array. The first pixel may be selected from any position, but the other pixels must stay at least the minimal radial offset with respect to the first pixel, and a second predetermined offset value, for example, one half of that minimal radial offset, with respect to the newly selected pixels. After the first iteration statistics are determined, the minimal radial offset is decreased, for example, divided by two from the previous value. This selection process ensures that transpositions have the largest mixture around the array.

Thus, in one embodiment, a top group of array configurations, possessing the lowest values of the cost function, are passed along to each next iteration of reducing the number of transposed pairs of pixels and reducing the minimal radial offset separation requirement. When the lowest value of cost function in an iteration changes by a predetermined amount, for example, approximately one percent from the lowest value of the previous iteration, the pattern with the lowest value of cost function is accepted as the final solution pattern.

In order to test the quality of this solution, the pattern may be used as the "seed point" for another round of calculations in order to determine if such a round of calculations will converge on a similar, but not necessarily identical, pattern. The variance of the final cost function can be used as a measure of the quality of the process.

Each of these solutions found on the later rounds of transpositions may be used as gray scale dither patterns. However, in alternate embodiments they may be used as the dither patterns for printing differing primary colors, such as magenta, cyan, and yellow. In a three color print, the dither pattern with the lowest value of the cost function should be used with magenta. A next lowest value may be used for cyan. This value is typically greater than that determined for magenta. In addition, a next lowest cost value may be used for yellow. In a four color print, with black, magenta, cyan, and yellow inks, the dither pattern with the lowest value of the cost function should be used with black, followed by the lowest values, which may be in order of increasing value of cost function by dither patterns for magenta, cyan, and yellow.

A change to the cost function of Equation 1 may be utilized. It has been assumed that the final gray BNM array is shift and inversion invariant since the pattern is supposed to be very close to "random" in nature. But when tiling of gray masks have been tried in the past, as shown above in connection with FIG. 3b, the edges may show the breakdown of the spatial invariance. This happens because of round-off, and because of the angular dependence of the human visual system.

In one embodiment, the present invention modifies the environment of the cost function of Equation 1 in order to force the system to have a better invariance to tiling operations. The size of the dither array is increased, in one embodiment by five units of visual acuity at the viewing resolution. For a 128 by 128 array at a viewing distance of 12 inches, this means the array needs to be increased to 141 by 141. This addition to the original data array makes the cost function of Equation 1 sensitive to the effects caused by the edges of the array when multiple dither array copies are tiled together. Note that only a 128 by 128 array is created, but that the cost function of that array was derived from the slightly larger array that considers the effects of adding any anomalies that would come from the edges of the shifted and inverted arrays. The edges of the original 128 by 128 array are the locations where such anomalies will appear when tiling is performed.

Figure 5:
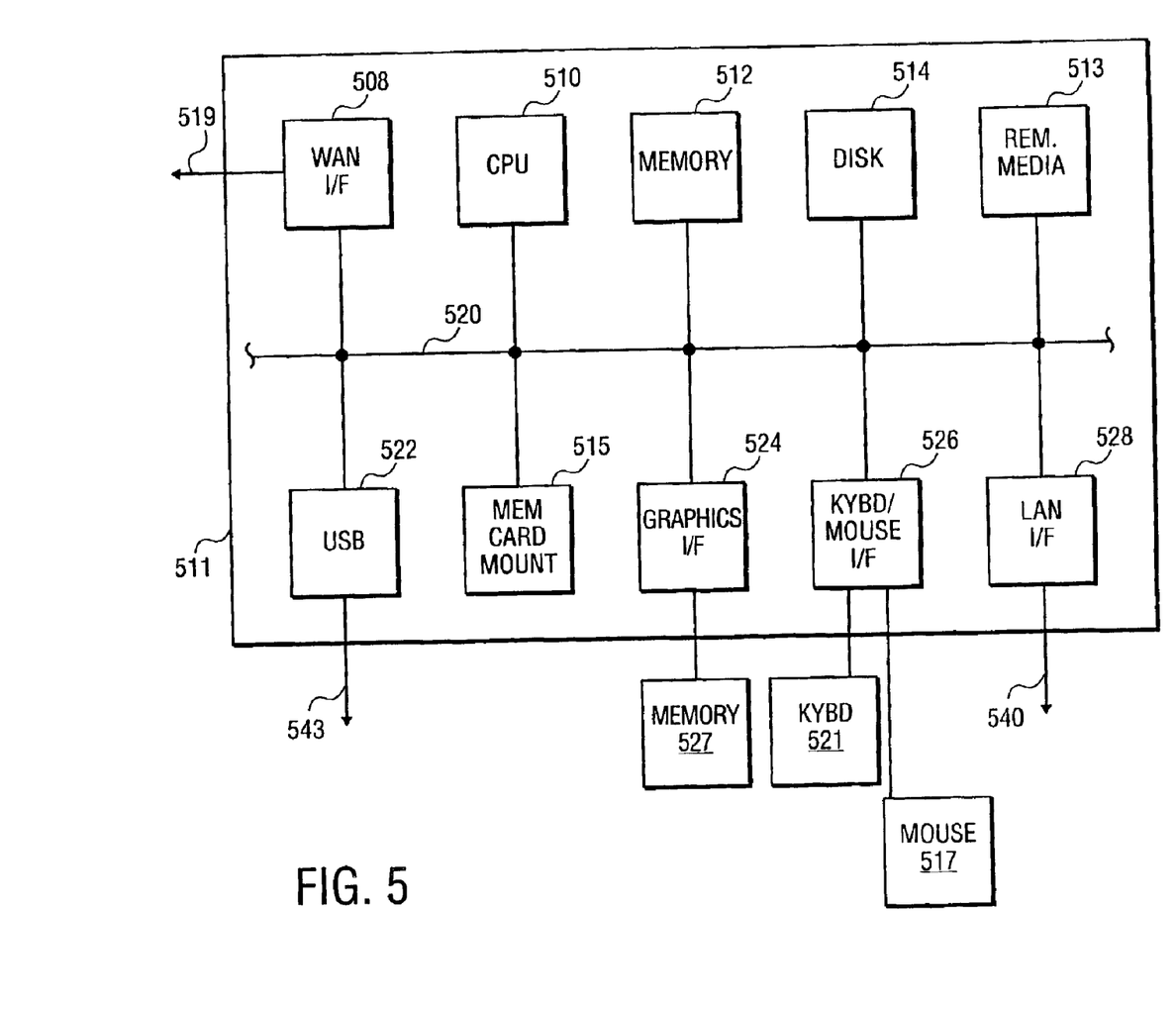
FIG. 5 is a block diagram of a computer system, according to one embodiment of the present invention.

Referring now to FIG. 5, a block diagram of a computer system is illustrated, according to one embodiment of the present invention. Personal computer 511 may include a WAN interface 508, a central processing unit (CPU) 510, a memory 512, a system disk 514, a removable media 513, a USB interface 522, a memory card mount 515, a graphics interface 525 supplying monitor 527, a keyboard/mouse interface 526 supplying keyboard 520 and mouse 517, and a local area network (LAN) interface 528. These functional units may be connected via a system bus 520. Memory 512 may include volatile random-access memory (RAM), programmable read-only memory (PROM), non-volatile Flash memory, or any other kind of memory. Removable media 513 may be a floppy disk, a removable magnetic disk, an optical or magneto-optical disk, semiconductor memory, or magnetic tape.

Figure 6:
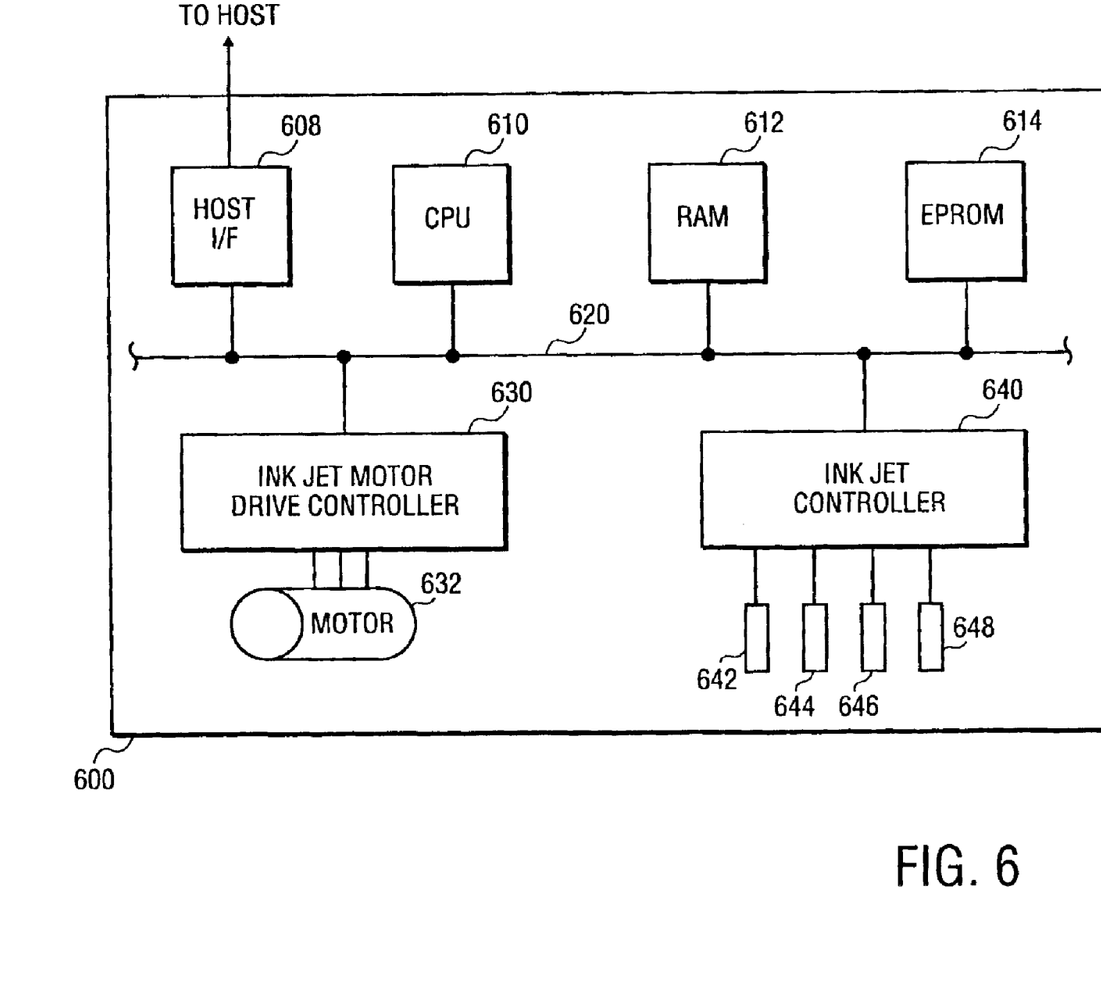
FIG. 6 is a block diagram of an ink-jet printer, according to one embodiment of the present invention.

Referring now to FIG. 6, a block diagram of an inkjet printer 600 is shown, according to one embodiment of the present invention. Ink-jet printer 600 may include a host interface 608, a CPU 610, an amount of RAM 612, an amount of non-volatile erasable programmable read-only memory (EPROM), an ink-jet motor drive controller 630 for controlling the operation of motor 632, and an ink-jet controller 640 for controlling the operation of cyan jet 642, magenta jet 644, yellow jet 646, and black jet 648. These functional units may be connected via a system bus 620.

Figure 7:
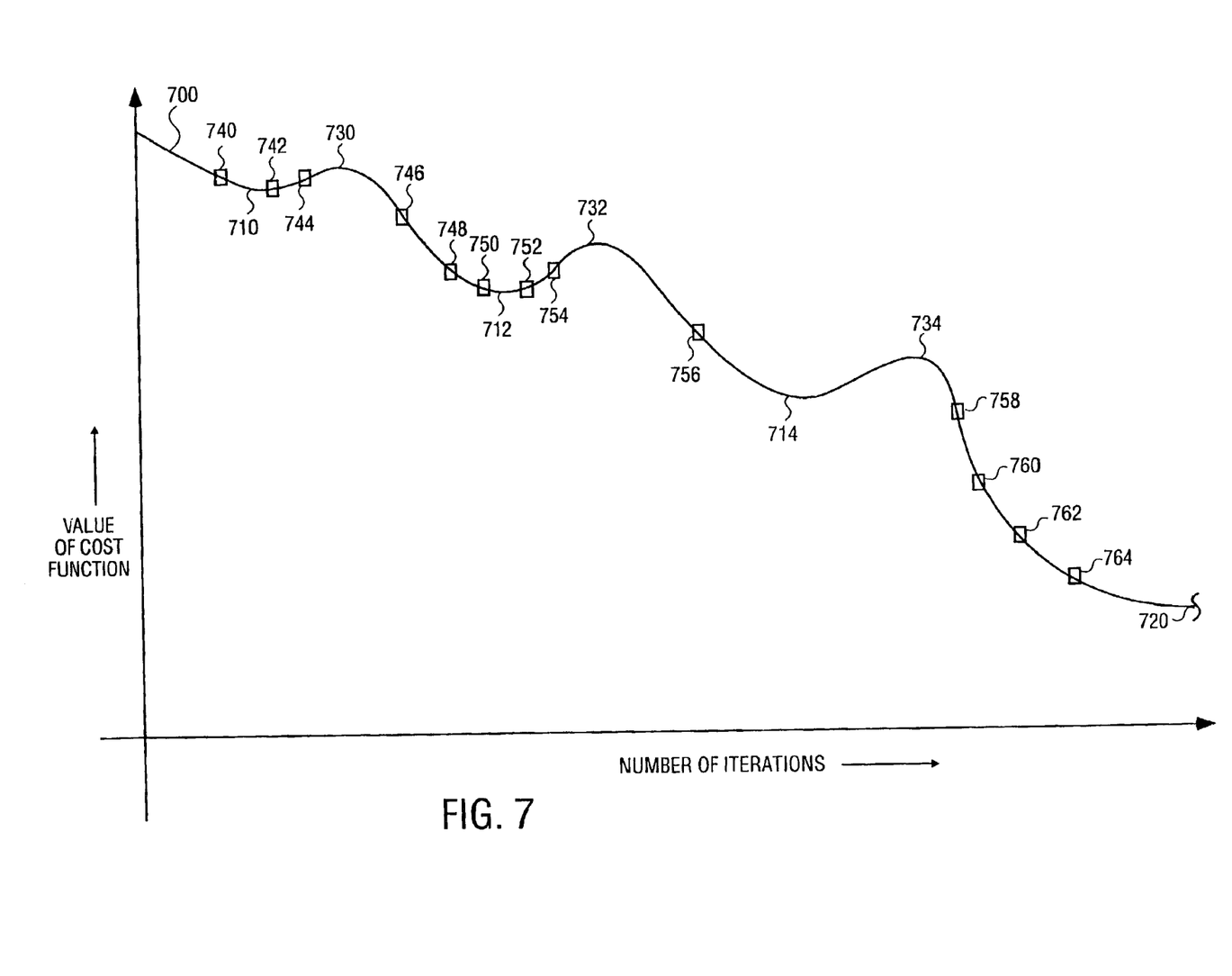
FIG. 7 is a graph of a cost function, according to an embodiment of the present invention.

FIG. 7 shows a graph of an exemplary cost function using the iterative process in accordance with the teachings of one embodiment of the present invention. The number of iterations is shown on the x axis, and the value of the cost function of the pattern at that iteration is shown on the y axis. The curve 700 of the cost function is then shown as a continuous curve for purposes of illustration. It is typical of curve 700 that there are several local minima 710, 712, 714, as well as several local maxima 730, 732, 734. A true minimum 720 is shown at the far right of the graph. One thing that may happen when changing a pair of pixels, when going from the cost function value 740 at one iteration to the values 742, 744 at subsequent iterations, is that subsequent iterations may yield a cost function value 744 that is larger than cost function value 740. This may happen even when the pattern giving cost function value 744 is a necessary intermediate step to an improved pattern giving a cost function value 746.

For this reason, in certain embodiments more than a single pair of pixels is transposed in each iteration of a cost function calculation. Transposing more than a single pair of pixels may help a more rapid convergence of cost function to a true minimal value by enabling the bypassing of local maximum values such as maxima 730, 732, and 734.

Figure 8:
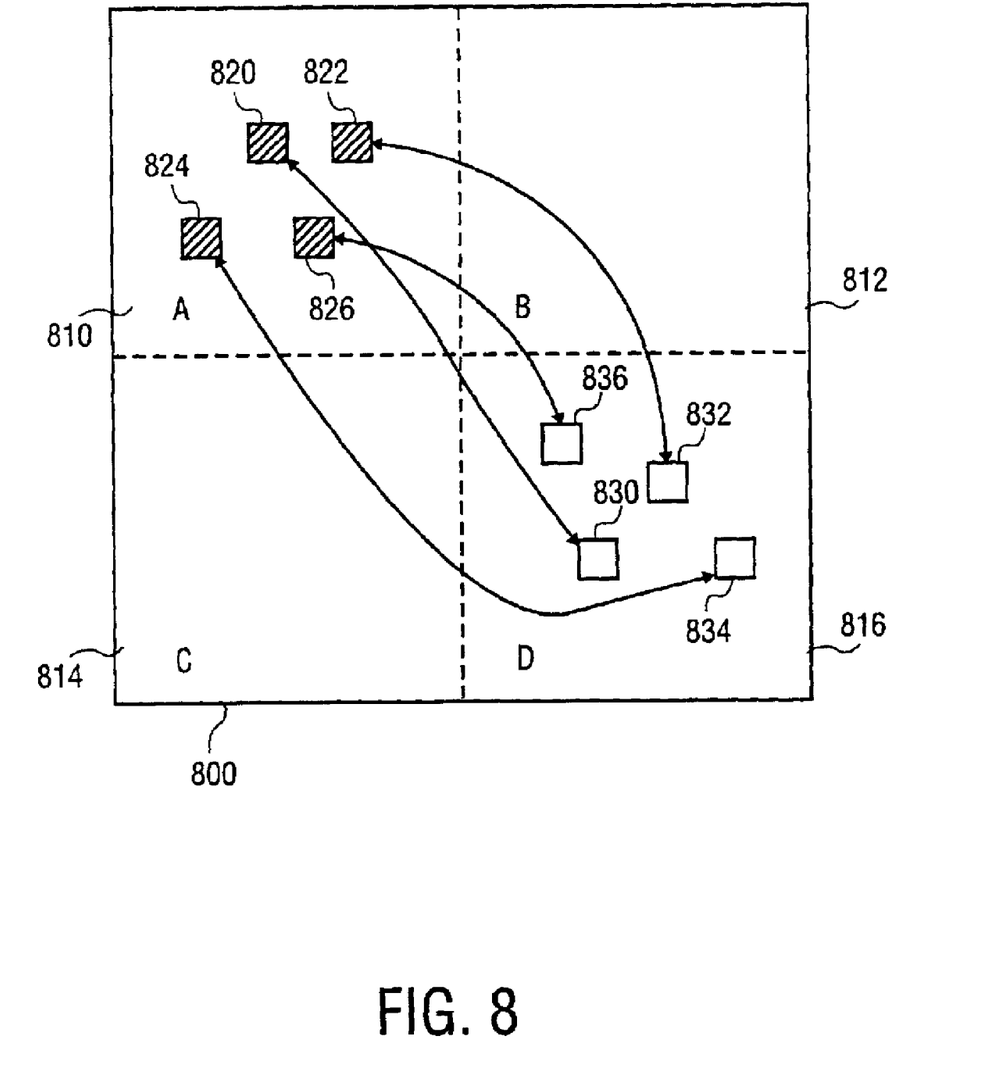
FIG. 8 is a diagram showing multiple pixel transpositions, according to one embodiment of the present invention.

Referring now to FIG. 8, a diagram showing multiple pixel transpositions is shown in accordance with one embodiment of the present invention. For clarity in the illustration, only those locations in the pattern that will be transposed are shown. In one embodiment, a starting pattern is used with fifty-percent coverage: half of the positions will be black pixels and half of the positions will be white pixels. The locations of the pixels in the starting pattern may be selected at random. This starting pattern may be used directly as a parent dither pattern in the following embodiments, or the starting pattern may be subject to several iterations of single pixel pair transpositions in order to more quickly move to a minimal value cost function. From such a pattern with fifty-percent coverage, other patterns with a smaller percentage of coverage may be derived by replacing black pixels with white pixels, thus deriving a dither matrix from a series of dither patterns.

Within dither array 800 four quadrants may be identified. These are quadrant A 810, quadrant B 812, quadrant C 814, and quadrant D 816. In other embodiments, alternate subdivisions of dither array 800 may be used. In the FIG. 8 embodiment, not only are multiple pairs of pixels transposed to yield new candidate dither patterns, but also the black pixel and white pixel members of the pairs should be suitably remote from each other. One way of doing this is to select pixels from differing quadrants. For example, first randomly select one quadrant of the four quadrants quadrant A 810, quadrant B 812, quadrant C 814, and quadrant D 816. In the FIG. 8 example, quadrant A 810 was randomly selected. Then, within quadrant A 810, four black pixels 820, 822, 824, and 826 were randomly selected. Next, one of the remaining quadrants, quadrant B 812, quadrant C 814, or quadrant D 816, is randomly selected as a location for white pixels. In the FIG. 8 example, quadrant D 816 was randomly selected from the remaining quadrants. Finally, within quadrant D 816, four white pixels 830, 832, 834, and 836 were randomly selected. When black pixels 820, 822, 824, and 826 are exchanged with white pixels 830, 832, 834, and 836, a new candidate dither pattern is created. This new candidate dither pattern, due to the designed separation of black pixels and white pixels, may be substantially different than the parent dither pattern.

Several candidate dither patterns may be created from a given parent dither pattern using the FIG. 8 approach. Then the cost function for each of the candidate dither patterns may be evaluated. If any of the candidate dither patterns has a cost function value lower than the parent dither pattern, then the candidate dither pattern with the lowest cost function value may be selected as a new parent dither pattern for a subsequent iteration. In this manner the convergence of the cost value in subsequent iterations may more rapidly approach a true minimum value, bypassing the limiting effects of local maximum values within the cost function.

In one embodiment, the number of iterations with four pairs of pixels (four black pixels and four white pixels) being transposed may be limited to only five or six iterations. In these early iterations single-precision calculations may be performed by a processor to save compute cycles. Then there may be further iterations with two pairs of pixels (two black pixels and two white pixels) being transposed. When the change in the value of the cost function in subsequent iterations reaches a small value, then single pairs of pixels may be transposed. During one of the later iterations, double-precision calculations may replace the single-precision calculations.

Figure 9:
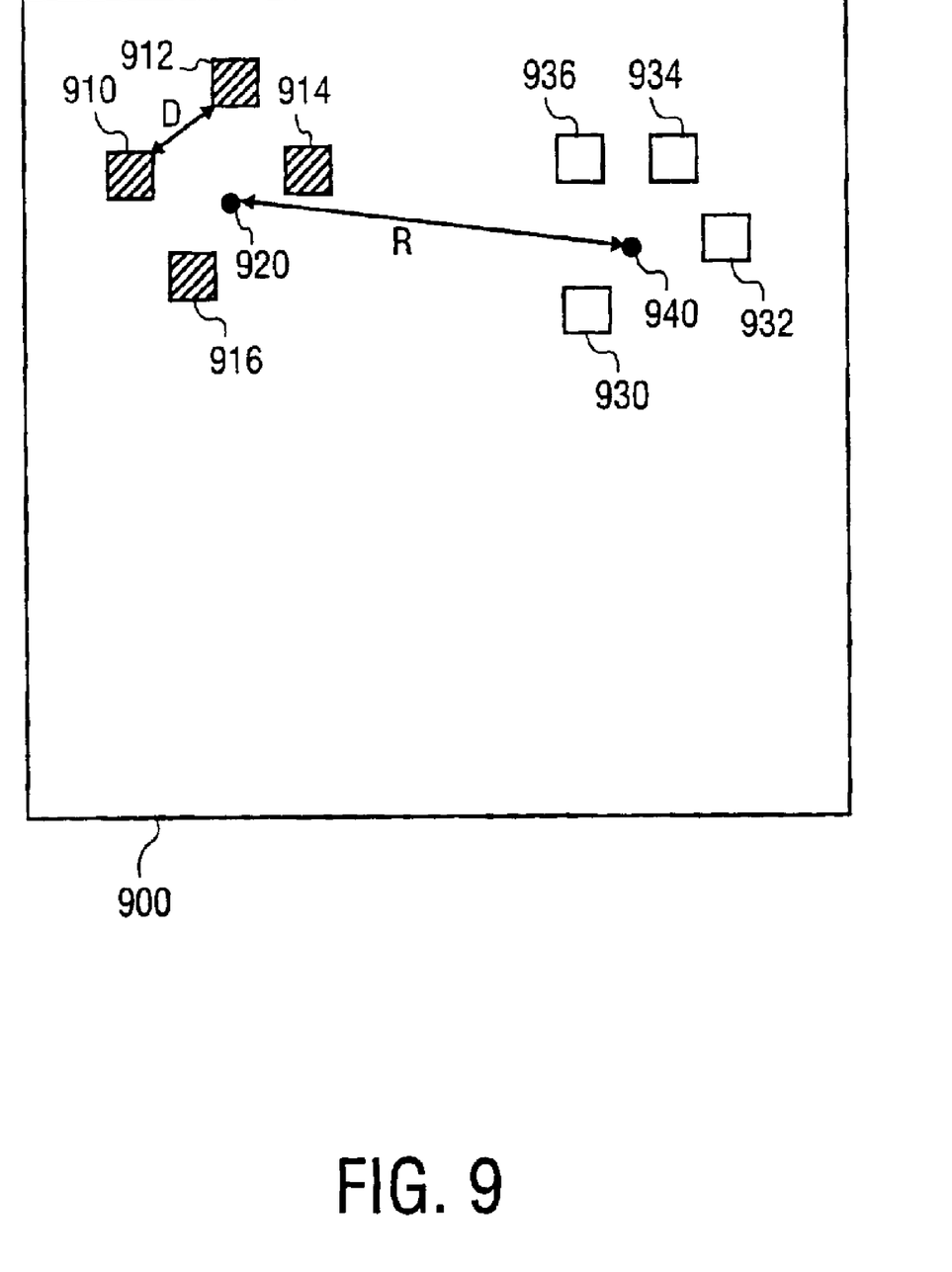
FIG. 9 is a diagram showing multiple pixel transpositions, according to another embodiment of the present invention.

Referring now to FIG. 9, a diagram showing multiple pixel transpositions is shown, according to another embodiment of the present invention. A central issue in the FIG. 8 embodiment was the need for separation of the pixels chosen to transpose in the candidate dither patterns. In one embodiment, the FIG. 9 process ensures the separation of the pixels in a different manner than the FIG. 8 process. A separation radius R is selected, where R may be, for example, one-eighth or one-quarter of the length of the sides of the dither array 900. Then a first black pixel 910 is selected at random. In some embodiments, additional black pixels may be selected at random. However, in the FIG. 9 embodiment additional black pixels 912, 914, and 916 are selected to lie at least a minimal distance D away from black pixel 910 and from each other. Candidate black pixels that lie within minimal distance D are discarded and new candidate black pixels are selected. When a proper set of black pixels 910, 912, 914, and 916 is determined, an average position 920 is calculated. Then a candidate set of four white pixels 930, 932, 934, and 936 is selected at random. An average position 940 of the four white pixels 930, 932, 934, and 936 is calculated, and the distance between the two average positions 920, 940 is calculated. If the distance between average positions 920, 940 is at least the separation radius R, the candidate set of four white pixels 930, 932, 934, and 936 is considered acceptable, and a new candidate dither matrix is formed by transposing black pixels 910, 912, 914, and 916 with white pixels 930, 932, 934, and 936. If, however, the distance between average positions 920, 940 is less than the separation radius R, then a new set of candidate white pixels is selected, and the process repeats until a proper set of candidate pixels is determined.

Figure 10:
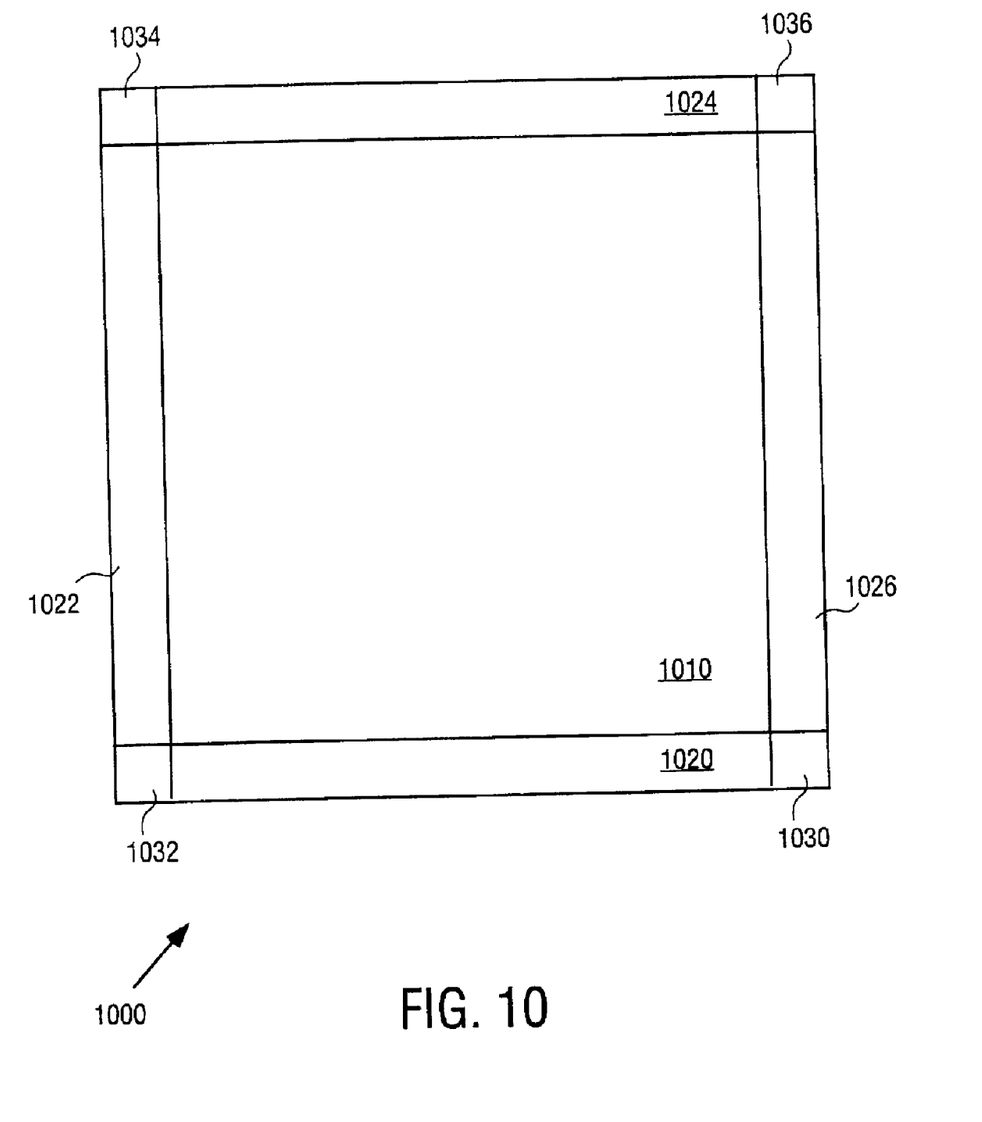
FIG. 10 illustrates achieving greater transformation invariance by edge enhancement in a dither matrix, according to one embodiment of the present invention.

Referring now to FIG. 10, achieving greater transformation invariance by edge enhancement in a dither matrix is illustrated, according to one embodiment of the present invention. The present invention may be used in the FIG. 3b method of tiling a dither matrix to cover a larger area. However, improved results are obtained when used in conjunction with a dither matrix of enhanced transformation invariance. In previous calculations for an original dither matrix, such as discussed above in connection with the discussions of FIG. 8 and FIG. 9 above, the calculations of Equation 1 are carried out within the boundaries of the eventual dither matrix. However, a dither matrix derived in this manner may not contain optimal transformation invariance because of the effects caused by the boundaries of the matrix.

Therefore, in one embodiment a dither matrix 910 may be derived using a larger geometric overall area 1000 during the calculations of Equation 1. In the FIG. 10 embodiment, additional boundary areas 1020, 1022, 1024, and 1026 are conjoined to dither matrix 1010. Corner areas 1030, 1032, 1034, and 1036 are defined geometrically by the attachment of boundary areas 1020, 1022, 1024, and 1026 but are not used in the following calculations. The boundary areas 1020, 1022, 1024, and 1026 may have widths of approximately 2.5 units of visual acuity. As an example, when viewed at approximately 12 inches, if dither matrix 1010 is of size 128 by 128 positions, then each of boundary areas 1020, 1022, 1024, and 1026 may be of size 12.5 positions.

The calculations of Equation 1 are performed on the overall area 1000, but may be omitted for corner areas 1030, 1032, 1034, and 1036. When a suitable minimum cost value is determined with respect to overall area 1000, the boundary areas 1020, 1022, 1024, and 1026, along with corner areas 1030, 1032, 1034, and 1036, may be stripped off and discarded. The remaining dither matrix 1010 will then possess enhanced transformational invariance, and therefore may give better results with the embodiments discussed above.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method for determining a dither matrix comprising:
   (a) transposing multiple pairs of pixels of a parent dither pattern to form at least one candidate pattern;
   (b) determining a cost function value for each of the at least one candidate patterns;
   (c) selecting at least one low cost pattern corresponding to at least one low cost function value;
   (d) reducing the multiple pairs of pixels to transpose;
   (e) transposing the reduced multiple pairs of pixels in the selected at least one low cost pattern;
   (f) determining a subsequent cost function value for each of the at least one transposed low cost patterns;
   (g) selecting at least one subsequent low cost pattern corresponding to at least one subsequent low cost value;
   (h) repeating steps (d–g) until a determined cost value threshold is met.

2. The method as set forth in claim 1, wherein the multiple pairs of pixels are multiples of two.

3. The method as set forth in claim 2, wherein reducing reduces the number of pairs of pixels to transpose by a factor of 2.

4. The method as set forth in claim 1, wherein selecting selects five low cost patterns corresponding to the five lowest cost function values.

5. The method as set forth in claim 1, wherein pixels of each pair of pixels are separated by spacing selected from the group consisting of subdivisions of the pattern and a minimal radial offset.

6. The method as set forth in claim 5, wherein step (d) further comprises reducing the minimal radial offset each time step (d) is repeated.

7. The method as set forth in claim 5, wherein subdivisions are quadrants of the pattern.

8. The method as set forth in claim 1, wherein the determined cost value threshold comprises determining whether a lowest cost function value of one repetition is below a predetermined percentage of a prior repetition.

9. The method as set forth in claim 1, wherein the subsequent low cost pattern is used for patterns selected from the group consisting of gray scale dither patterns, three color dither patterns and four color dither patterns.

10. The method as set forth in claim 1, further comprising increasing the size of the dither patterns to have better invariance to tiling operations.

11. The method as set forth in claim 1, further comprising selecting said parent dither pattern to include selecting randomly half of the parent dither pattern to be black.

12. A system comprising:
a parent dither pattern comprising pixels;
a processor coupled to receive the parent dither pattern, said processor transposing multiple pairs of pixels of a parent dither pattern to form at least one candidate pattern; determining a cost function value for each of the at least one candidate patterns; selecting at least one low cost pattern corresponding to at least one low cost function value; reducing the multiple pairs of pixels to transpose; transposing the reduced multiple pairs of pixels in the selected at least one low cost pattern; determining a subsequent cost function value for each of the at least one transposed low cost patterns; selecting at least one subsequent low cost pattern corresponding to at least one subsequent low cost value, and performing iterations of reducing, transposing determining and selecting until a determined cost value threshold is met.

13. The system as set forth in claim 12, wherein the multiple pairs of pixels are multiples of two.

14. The system as set forth in claim 12, wherein selecting selects five low cost patterns corresponding to the five lowest cost function values.

15. The system as set forth in claim 13, wherein reducing reduces the number of pairs of pixels to transpose by a factor of 2.

16. The system as set forth in claim 12, wherein pixels of each pair of pixels are separated by spacing selected from the group consisting of subdivisions of the pattern and a minimal radial offset.

17. The system as set forth in claim 16, wherein reducing further comprises reducing the minimal radial offset for each iteration.

18. The system as set forth in claim 12, wherein the determined cost value threshold comprises a lowest cost function value of one repetition which is below a predetermined percentage of a prior repetition.

19. The system as set forth in claim 12, wherein the subsequent low cost pattern is used for patterns selected from the group consisting of gray scale dither patterns, three color dither patterns and four color dither patterns.

20. A computer readable medium comprising instructions, which when executed by a processing system perform the method comprising:
(a) transposing multiple pairs of pixels of a parent dither pattern to form at least one candidate pattern;
(b) determining a cost function value for each of the at least one candidate patterns;
(c) selecting at least one low cost pattern corresponding to at least one low cost function value;
(d) reducing the multiple pairs of pixels to transpose;
(e) transposing the reduced multiple pairs of pixels in the selected at least one low cost pattern;
(f) determining a subsequent cost function value for each of the at least one transposed low cost patterns;
(g) selecting at least one subsequent low cost pattern corresponding to at least one subsequent low cost value;
(h) repeating steps (d–g) until a determined cost value threshold is met.

21. The computer readable medium as set forth in claim 20, wherein the multiple pairs of pixels are multiples of two.

22. The computer readable medium as set forth in claim 20, wherein selecting selects five low cost patterns corresponding to the five lowest cost function values.

23. The computer readable medium as set forth in claim 21, wherein reducing reduces the number of pairs of pixels to transpose by a factor of 2.

24. The computer readable medium as set forth in claim 20, wherein pixels of each pair of pixels are separated by spacing selected from the group consisting of subdivisions of the pattern and a minimal radial offset.

25. The computer readable medium as set forth in claim 24, wherein step (d) further comprises reducing the minimal radial offset each time step (d) is repeated.

26. The computer readable medium as set forth in claim 24, wherein subdivisions are quadrants of the pattern.

27. The computer readable medium as set forth in claim 20, wherein the determined cost value threshold comprises determining whether a lowest cost function value of one repetition is below a predetermined percentage of a prior repetition.

28. The computer readable medium as set forth in claim 20, wherein the subsequent low cost pattern is used for patterns selected from the group consisting of gray scale dither patterns, three color dither patterns and four color dither patterns.

29. The computer readable medium as set forth in claim 20, further comprising increasing the size of the dither patterns to have better invariance to tiling operations.

30. The computer readable medium as set forth in claim 20, further comprising selecting said parent dither pattern to include selecting randomly half of the parent dither pattern to be black.

* * * * *